US009380225B2

(12) United States Patent
Tiscareno et al.

(10) Patent No.: US 9,380,225 B2
(45) Date of Patent: Jun. 28, 2016

(54) SYSTEMS AND METHODS FOR RECEIVING INFRARED DATA WITH A CAMERA DESIGNED TO DETECT IMAGES BASED ON VISIBLE LIGHT

(71) Applicant: Apple Inc., Cupertino, CA (US)

(72) Inventors: Victor M. Tiscareno, Issaquah, WA (US); Kevin W. Jonhson, Mundelein, IL (US); Cindy H. Lawrence, University Place, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/492,667

(22) Filed: Sep. 22, 2014

(65) Prior Publication Data
US 2015/0042819 A1 Feb. 12, 2015

Related U.S. Application Data

(63) Continuation of application No. 12/629,678, filed on Dec. 2, 2009, now Pat. No. 8,848,059.

(51) Int. Cl.
*H04N 5/232* (2006.01)
*H04B 10/116* (2013.01)
*H04N 5/33* (2006.01)
*H04B 10/114* (2013.01)

(52) U.S. Cl.
CPC ............ *H04N 5/332* (2013.01); *H04B 10/116* (2013.01); *H04B 10/1141* (2013.01); *H04N 5/232* (2013.01); *H04N 5/23209* (2013.01)

(58) Field of Classification Search
CPC ... H04N 5/232; H04N 5/23209; H04B 10/116
USPC .............................................. 348/164, E5.09
See application file for complete search history.

(56) References Cited

U.S. PATENT DOCUMENTS

| 5,225,903 | A | 7/1993 | Wittrin |
| 6,107,618 | A | 8/2000 | Fossum et al. |
| 6,700,613 | B1 * | 3/2004 | Bryant et al. ................ 348/164 |
| 6,809,792 | B1 * | 10/2004 | Tehranchi et al. ...... 348/E5.137 |
| 7,460,160 | B2 * | 12/2008 | Hershey ................ H04N 5/33 348/E5.09 |
| 8,416,302 | B2 * | 4/2013 | Zhang ................ H04N 5/23219 348/164 |
| 8,614,747 | B2 * | 12/2013 | Alt ........................ G06T 7/0044 348/164 |
| 8,848,059 | B2 * | 9/2014 | Tiscareno et al. ............. 348/164 |
| 2005/0265584 | A1 | 12/2005 | Dobson et al. |

(Continued)

FOREIGN PATENT DOCUMENTS

WO 2009/068836 6/2009

*Primary Examiner* — Bharat N Barot
(74) *Attorney, Agent, or Firm* — Blank Rome LLP

(57) ABSTRACT

Systems and methods for receiving infrared data with a camera designed to detect images based on visible light are provided. A system can include a camera and image processing circuitry electrically coupled to the camera. The image processing circuitry can determine whether each image detected by the camera includes an infrared signal with encoded data. If the image processing circuitry determines that an image includes an infrared signal with encoded data, the circuitry may route at least a portion of the image (e.g., the infrared signal) to circuitry operative to decode the encoded data. If the image processing circuitry determines that an image does not include an infrared signal with encoded data, the circuitry may route the image to a display or storage. Images routed to the display or storage can then be used as individual pictures or frames in a video because those images do not include any effects of infrared light communications.

14 Claims, 9 Drawing Sheets

(56) References Cited

U.S. PATENT DOCUMENTS

| | | |
|---|---|---|
| 2007/0081084 A1 | 4/2007 | Wernersson |
| 2008/0260391 A1 | 10/2008 | Asukai et al. |
| 2009/0095906 A1 | 4/2009 | Gavner et al. |
| 2009/0160956 A1 | 6/2009 | Yumiki et al. |
| 2010/0013932 A1* | 1/2010 | daCosta ........................ 348/157 |
| 2011/0102599 A1 | 5/2011 | Kwon et al. |
| 2012/0062751 A1* | 3/2012 | Homma ................ G01N 29/04 348/164 |

* cited by examiner

SYSTEMS AND METHODS FOR RECEIVING INFRARED DATA WITH A CAMERA DESIGNED TO DETECT IMAGES BASED ON VISIBLE LIGHT

CROSS-REFERENCE TO RELATED APPLICATIONS

This application is a continuation of U.S. patent application Ser. No. 12/629,678 filed Dec. 2, 2009 (now U.S. Pat. No. 8,848,059), the entirety of which is incorporated herein by reference.

BACKGROUND OF THE INVENTION

This is directed to infrared data transmission. In particular, this is directed to systems and methods for receiving infrared data with a camera designed to detect images based on visible light.

Many electronic devices include cameras designed to detect images. For example, a traditional cellular telephone or portable media player may include a camera. Such cameras can typically detect images based on visible light but do not receive any data communications through either visible or invisible light. Accordingly, the functionality of cameras in traditional electronic devices is limited.

SUMMARY OF THE INVENTION

This is directed to systems and methods for receiving infrared data with a camera designed to detect images based on visible light. A system can include a camera and image processing circuitry electrically coupled to the camera. The image processing circuitry can determine whether each image detected by the camera includes an infrared signal with encoded data. If the image processing circuitry determines that an image includes an infrared signal with encoded data, the circuitry may route at least a portion of the image (e.g., the infrared signal) to circuitry operative to decode the encoded data. If the image processing circuitry determines that an image does not include an infrared signal with encoded data, the circuitry may route the image to a display or storage. Images routed to the display or storage can then be used as individual pictures or frames in a video because those images do not include any effects of infrared light communications.

Based on the decoded data, a device can display information to a user or modify an operation of the device. In some embodiments, a device can, based on received infrared data, display information to a user relating to an object near the user. For example, an infrared emitter can be located near an object and generate infrared signals with encoded data that includes information about that object. An electronic device can then receive the infrared signals, decode the data and display the information about the object to the user. In some embodiments, a device can, based on received infrared data, disable a function of the device. For example, an infrared emitter can be located in areas where picture or video capture is prohibited, and the emitter can generate infrared signals with encoded data that includes commands to disable the recording functions of devices. An electronic device can then receive the infrared signals, decode the data and temporarily disable the device's recording function based on the command.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to systems and methods for receiving infrared data with a camera designed to detect images based on visible light. An electronic device can receive infrared data with a camera that is designed to detect visible light. For example, an electronic device can include a camera for capturing pictures or videos based on visible light and that camera can also be used to receive infrared data. To prevent the infrared data from interfering with the camera's other functions (e.g., capturing pictures or videos), the electronic device may analyze the camera's outputs to determine which images include an infrared signal with encoded data. Accordingly, images (e.g., single pictures or frames of a video) that include an infrared signal with encoded data can be routed to circuitry that can decode the encoded data (e.g., a processor or dedicated decoding circuitry). The decoded data can then be used to convey information to a user (e.g., through a display) or modify the device's operation (e.g., apply a watermark to a detected image or disable a function of the device). Images that do not include an infrared signal with encoded data can be routed to other components of a device for more traditional image functions. For example, images that do not include an infrared signal can be routed to a display that can display the images to a user or storage that can record the images. It may be advantageous to only route images that do not include an infrared signal with encoded data to a display or storage because an infrared signal with encoded data may affect portions of the image. For example, an infrared signal may overcome visible light detected by the camera so that at least portions of the image are washed out or blacked out.

Figure 1:
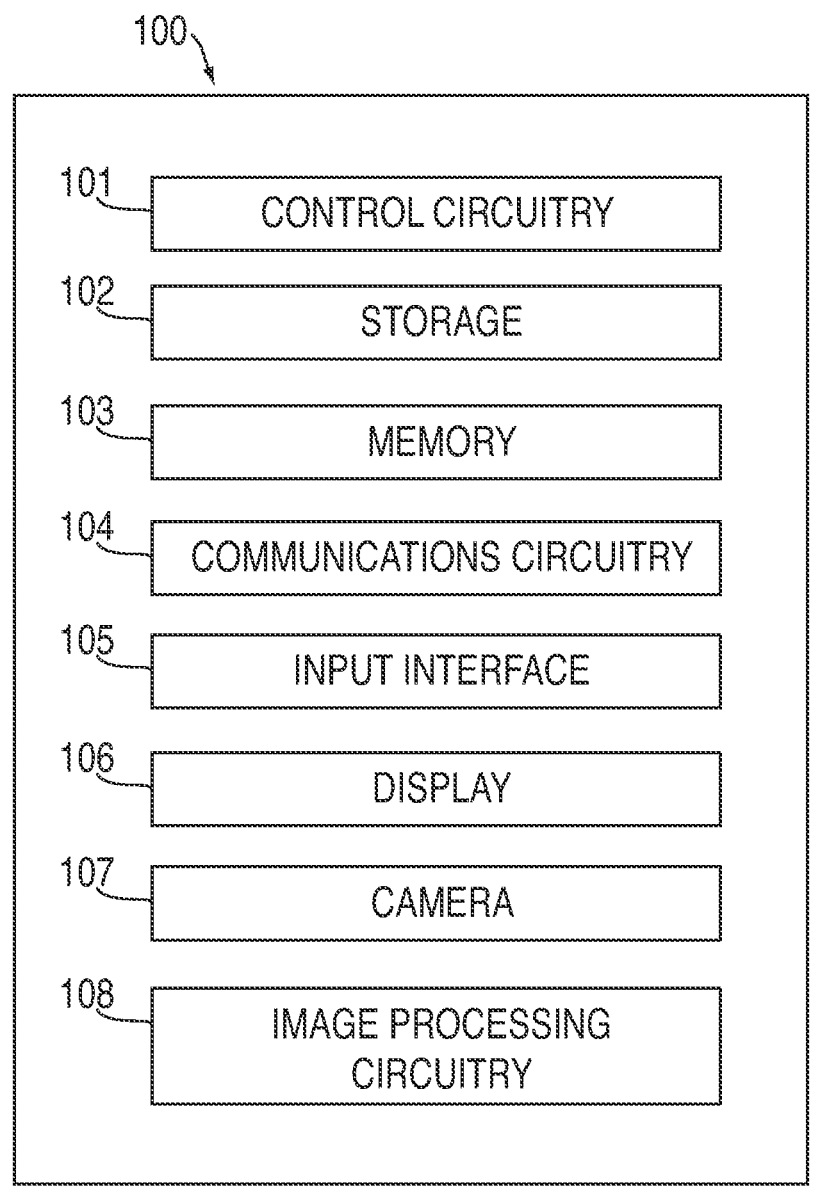
FIG. 1 is a block diagram of an illustrative electronic device for receiving infrared data in accordance with one embodiment of the invention.

FIG. 1 is a schematic view of an illustrative electronic device for receiving infrared data in accordance with one embodiment of the invention. Electronic device 100 can include control circuitry 101, storage 102, memory 103, communications circuitry 104, input interface 105, display 106, camera 107 and image processing circuitry 108. In some embodiments, one or more of the components of electronic device 100 can be combined or omitted. For example, storage 102 and memory 103 can be combined into a single mechanism for storing data. In some embodiments, electronic device 100 can include other components not combined or included in those shown in FIG. 1, such as a power supply (e.g., a battery or kinetics) or a bus. In some embodiments, electronic device 100 can include several instances of the components shown in FIG. 1 but, for the sake of simplicity, only one of each of the components is shown in FIG. 1. For example, device 100 can include multiple cameras at different locations on the device (e.g., a front camera and a back camera).

Electronic device 100 can include any suitable type of electronic device operative to capture an image (e.g., a picture or a frame of a video). For example, electronic device 100 can include a media player with a camera such as an iPod® available by Apple Inc., of Cupertino, Calif., a cellular telephone with a camera, a personal e-mail or messaging device with a camera (e.g., a Blackberry® or a Sidekick®), an iPhone® available from Apple Inc., a pocket-sized personal computer with a camera, a personal digital assistant (PDA) with a camera, a laptop computer with a camera, a cyclocomputer with a camera, a music recorder with a camera, a video recorder with a camera, a stand-alone camera, and any other suitable electronic device with an image sensor. In some embodiments, electronic device 100 can perform a single function (e.g., a device dedicated to capturing images) and in other embodiments, electronic device 100 can perform multiple functions (e.g., a device that plays music, captures images, displays pictures or video, stores pictures or video, and receives and transmits telephone calls).

Control circuitry 101 can include any processing circuitry or processor operative to control the operations and performance of an electronic device of the type of electronic device 100. Storage 102 and memory 103, which can be combined can include, for example, one or more storage mediums or memory used in an electronic device of the type of electronic device 100. In particular, storage 102 and memory 103 can store images as well as data representing received infrared data.

Communications circuitry 104 can include any suitable communications circuitry operative to connect to a communications network and to transmit communications (e.g., voice or data) from device 100 to other devices within the communications network. Communications circuitry 104 can be operative to interface with the communications network using any suitable communications protocol such as, for example, Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. In some embodiments, communications circuitry 104 can be operative to provide wired communications paths for electronic device 100.

Input interface 105 can include any suitable mechanism or component for receiving inputs from a user. In some embodiments, input interface 105 can include a touch interface for receiving touch inputs from a user. For example, input interface 105 can include a capacitive touch assembly for receiving touch inputs from a user. In some embodiments, input interface 105 can include a touch interface for receiving touch inputs from a user that include multi-touch gestures. Input interface 105 can also include circuitry operative to convert (and encode/decode, if necessary) analog signals and other signals into digital data, for example in any manner typical of an electronic device of the type of electronic device 100.

Display 106 can include any suitable mechanism for displaying visual content (e.g., images or indicators representing data). For example, display 106 can include a thin-film transistor liquid crystal display (LCD), an organic liquid crystal display (OLCD), a plasma display, a surface-conduction electron-emitter display (SED), organic light-emitting diode display (OLED), or any other suitable type of display. In some embodiments, display 106 can include a backlight for illuminating the display. For example, display 106 can include one or more incandescent light bulbs, light-emitting diodes (LEDs), electroluminescent panels (ELPs), cold cathode fluorescent lamps (CCFL), hot cathode fluorescent lamps (HCFL), any other suitable light source, or any combination thereof. Display 106 can display visual content in black-and-white, color, or a combination of the two. Display 106 can display visual content at any suitable brightness level or resolution. In some embodiments, the brightness level or resolution of display 106 can be adjusted by a user (e.g., through display configuration options). Display 106 can be electrically coupled with control circuitry 101, storage 102, memory 103, any other suitable components within device 100, or any combination thereof. Display 106 can display images stored in device 100 (e.g., stored in storage 102 or memory 103) or captured by device 100 (e.g., captured by camera 107).

Camera 107 can include any suitable device for detecting images based on visible light. For example, camera 107 can detect single pictures or video frames based on visible light. Camera 107 can also detect infrared signals with encoded data. For example, camera 107 can detect images that include infrared signals. In some embodiments, camera 107 may include a filter for blocking light of particular wavelengths or ranges of wavelengths. For example, camera 107 can include a filter that blocks infrared light near the edge of the visible light spectrum (e.g., near 700 nm) but not infrared light with a substantially longer wavelengths (e.g., near 850 nm or 950 nm). Camera 107 can include any suitable type of sensor for detecting visible and infrared light in an environment. In some embodiments, camera 107 can include a lens and one or more sensors that generate electrical signals. The sensors of camera 107 can be provided on a charge-coupled device (CCD) integrated circuit, for example.

Image processing circuitry 108 can include circuitry for processing the output of a camera. For example, image processing circuitry 108 can include circuitry for converting signals from one or more sensors in camera 107 to one or more digital formats. Image processing circuitry 108 can be electrically coupled to camera 107. Image processing circuitry 108 can receive images detected by camera 107, including images detected by camera 107 that include infrared signals with encoded data. In some embodiments, image processing circuitry 108 can determine whether a detected image includes an infrared signal with encoded data. For example, image processing circuitry 108 can determine whether a detected image includes more than a certain number of pixels representing infrared light. In some embodiments, image processing circuitry 108 can include circuitry for pre-processing digital images before they are transmitted to other circuitry within device 100.

As previously described, an electronic device can receive infrared data with a camera designed to detect images based on visible light. In accordance with the disclosure, any suitable device with an infrared emitter can generate infrared signals with data encoded therein. For example, a transmitter with an infrared emitter can generate infrared signals with encoded data. The combination of a device generating infrared signals with encoded data and a device that can receive infrared signals with a camera designed to detect images based on visible light can form a communications system.

Figure 2:
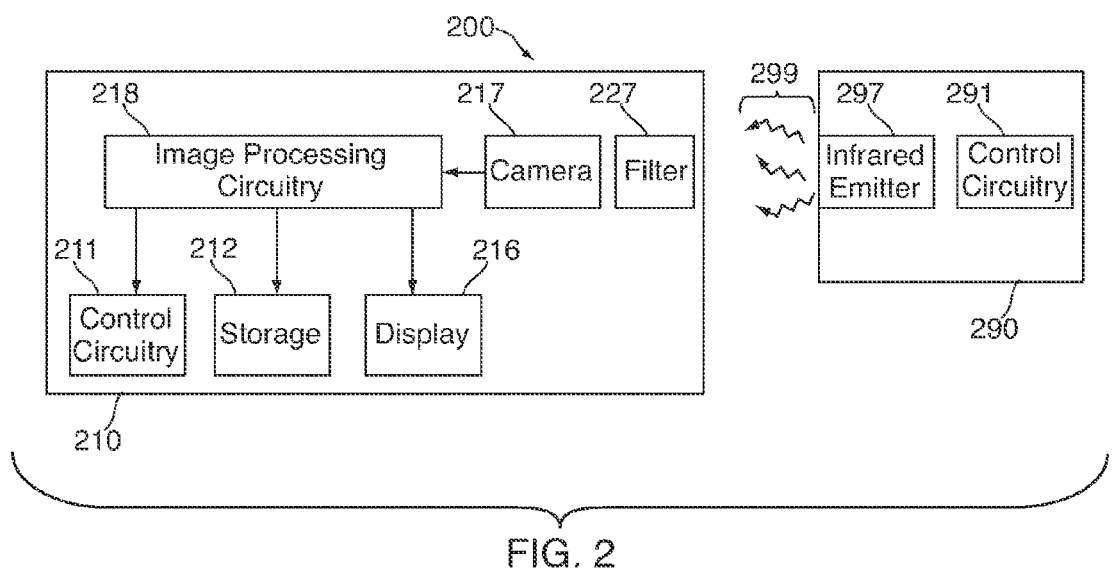
FIG. 2 is a schematic view of an illustrative system for communicating infrared data in accordance with one embodiment of the invention.

FIG. 2 is a schematic view of system 200 for communicating infrared data in accordance with one embodiment of the invention. System 200 can include transmitter 290 and electronic device 210. Transmitter 290 can generate infrared signal 299 with encoded data and electronic device 210 can detect one or more images that include infrared signal 299. Electronic device 210 can then decode the data in infrared signal 299 and provide information to a user and/or modify its operation based on the decoded data.

Transmitter 290 can include any device for generating infrared signals. In some embodiments, transmitter 290 can be a dedicated device for generating infrared signals with encoded data. In other embodiments, transmitter 290 can be integrated into a device that performs other functions (e.g., a light, a security camera or an access card reader) in addition to generating infrared signals with encoded data. Transmitter 290 can include any components suitable for generating infrared signals. For example, transmitter 290 can include infrared emitter 297 electrically coupled with control circuitry 291.

Infrared emitter 297 can include any component that can transmit infrared signals based on a control signal. For example, infrared emitter 297 can include an infrared light-emitting diode (LED). In some embodiments, infrared emitter 297 may emit a strobe of infrared light that cameras in the same general area of transmitter 290 can detect, regardless of the direction the cameras are facing. For example, transmitter 290 can function as a beacon generating an infrared signal that is easy for cameras to detect. In other embodiments, infrared emitter 297 may emit a directed beam of infrared light that only cameras in the path of the beam can detect. For example, transmitter 290 can function as a "spot light" generating an infrared signal that can only be received by cameras generally in front of transmitter 290.

Infrared emitter 297 can receive control signals from control circuitry 291 and generate infrared signals based on the control signals. Control circuitry 291 can include any timing circuitry, processing circuitry, processor or other suitable circuitry operative to control the infrared signals generated by emitter 297. In addition to infrared emitter 297 and control circuitry 291, transmitter 290 can include any other suitable components for generating infrared signals with encoded data. For example, transmitter 290 can include a power source, such as a battery (not shown), to power infrared emitter 297 and control circuitry 291.

Infrared signal 299 can include data encoded in any suitable manner. For example, infrared signal 299 can include data encoded based on amplitude modulation, frequency modulation, phase modulation or a combination thereof. In another example, infrared signal 299 can include data encoded based on selectively activating different light sources (e.g., activating different combinations of infrared emitters). Data encoded in infrared signal 299 can correspond to any suitable information or commands. In some embodiments, infrared signal 299 can include encoded data that represents information about an object adjacent to transmitter 290. For example, transmitter 290 can be located adjacent to a museum exhibit and infrared signal 299 can include encoded data that represents information about the exhibit. In some embodiments, infrared signal 299 can include encoded data that represents a command. For example, transmitter 290 can be located in an area where photography is prohibited and infrared signal 299 can include encoded data that represents a command to disable recording functions.

Electronic device 210 can be substantially similar to electronic device 100 shown in FIG. 1 and the previous description of the latter can be applied to the former. For example, electronic device 210 can include control circuitry 211, storage 212, display 216 and image processing circuitry 218 that are substantially similar to, respectively, to control circuitry 101, storage 102, display 106 and image processing circuitry 108 of device 100. Electronic device 210 can also include other suitable components for an electronic device (see, e.g., storage 102, memory 103, communications circuitry 104, and input interface 105, each of which is shown in FIG. 1).

Electronic device 210 can include a filter for blocking portions of the electromagnetic spectrum from camera 217. For example, electronic device 210 can include filter 227 disposed adjacent to camera 217. Filter 227 can block light of particular wavelengths or ranges of wavelengths from camera 217. In some embodiments, filter 227 can block infrared light near the edge of the visible light spectrum (e.g., near 700 nm) but not infrared light with substantially longer wavelengths (e.g., near 850 nm or 950 nm).

An electronic device can receive infrared data from a transmitter by selectively routing images, or portions thereof, to circuitry within the device. For example, images that include infrared data can be routed to control circuitry for decoding (see, e.g., control circuitry 101 shown in FIG. 1) and images that do not include infrared data can be routed to a display or storage (see, e.g., display 106 and storage 102, each of which is shown in FIG. 1). Accordingly, electronic device 210 can receive infrared data from transmitter 290 by selectively routing images, or portions thereof, using image processing circuitry 218. In some embodiments, image processing circuitry 218 can route images, or portions thereof, based on whether or not the images include infrared signals with encoded data.

Image processing circuitry 218 can use any suitable technique or combination of techniques for determining if a detected image includes an infrared signal with encoded data. For example, image processing circuitry 218 may determine the number of pixels in a detected image that represent infrared light and compare that number to a threshold. In another example, image processing circuitry 218 may determine if a detected image includes pixels that represent a spatial pattern of infrared light. In yet another example, image processing circuitry 218 may determine if a sequence of detected images includes pixels that represent a temporal pattern of infrared light.

If an image includes an infrared signal with encoded data, image processing circuitry 218 can route at least a portion of the signal to control circuitry 211. For example, image processing circuitry 218 can route the infrared signal to control circuitry 211 for decoding the data in the signal. Control circuitry 211 can then perform a function based on the decoded data. For example, control circuitry 211 may instruct display 216 to display information to a user based on the decoded data. In another example, control circuitry 211 may disable a device function (e.g., a recording function) based on the decoded data.

On the other hand, if an image does not include any infrared signals with encoded data, image processing circuitry 108 can route the image to display 216 for displaying the image and/or storage 212 for storing the image. For example, if image processing circuitry 218 determines an absence of infrared signals with encoded data in an image, it may route the image to display 216 for displaying the image. In another example, if image processing circuitry 218 determines an absence of infrared signals with encoded data in an image, it may route the image to storage 212 for later retrieval. In some embodiments, only images that do not include infrared signals with encoded data may be routed to a display. This may be advantageous because it may avoid displaying images that are visibly affected by infrared signals (e.g., images that include a washed out portion or a blacked out portion from an infrared signal).

Figure 3:
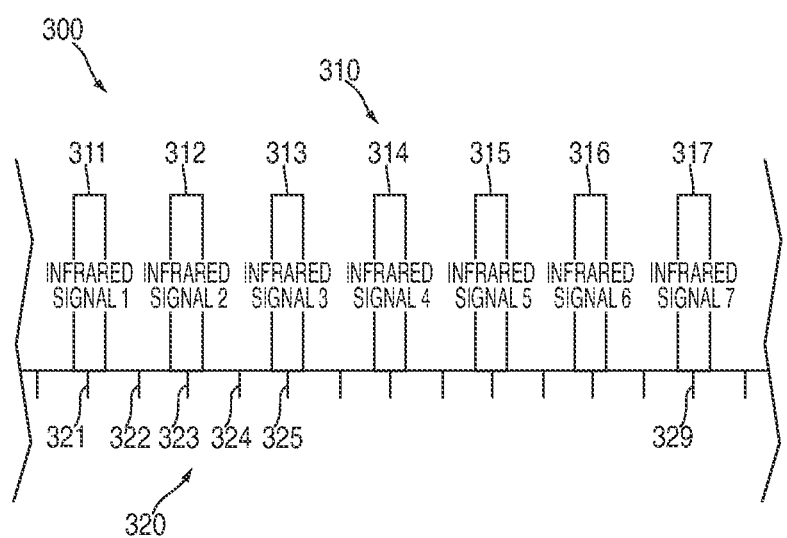
FIG. 3 is a timing diagram of infrared data communications in accordance with one embodiment of the invention.

In some embodiments, an electronic device may detect consecutive images (e.g., video frames) based on the timing of an infrared signal with encoded data. For example, an infrared signal may include active segments of infrared transmission with gaps in between the segments and an electronic device may detect images at a sampling rate that is twice that of the active segments. Accordingly, the electronic device may alternate between detecting images with an infrared signal for decoding and images without an infrared signal for displaying and/or storing. FIG. 3 includes timing diagram 300 of infrared communications in accordance with one embodiment of the invention. Diagram 300 shows signal segments 310 (e.g., segments 311-317) and image detection points 320 (e.g., detection points 321-325 and detection point 329).

As previously explained, an infrared signal with encoded data can include multiple signal segments 310 that are distributed over time with gaps in between the signal segments. Each of signal segments 310 (see e.g., segments 311-317) can include a portion of an infrared signal. An infrared signal with encoded data can be divided into signal segments using any suitable technique. In some embodiments, a signal segment can include infrared light at an amplitude, frequency or phase that is modulated to represent data. For example, segment 312 may be a burst of infrared light at a first frequency and segment 323 may be a burst of infrared light at a second frequency. In some embodiments, the amplitude, frequency or phase of a signal segment can represent a binary bit that is either high or low. For example, segment 312 may be a burst of relatively high-frequency infrared light (e.g., a high bit) and segment 313 may be a burst of relatively low-frequency infrared light (e.g., a low bit).

Based on the timing of signal segments, an electronic device can detect images at a suitable frequency. For example, image detection points 320 can be timed based on the frequency at which signal segments 310 are provided. In some embodiments, image detection points 320 can occur at a frequency that is twice the frequency at which signal segments 310 are provided. For example, image detection points 320 can include a point corresponding to each signal segment (e.g., point 323 corresponding to segment 312) as well as a point corresponding to each gap between the signal segments (e.g., point 324 corresponding to the gap between segments 312 and 313). Accordingly, images detected by an electronic device may alternate between images that include an infrared signal with encoded data (e.g., images suitable for decoding) and images that do not include any infrared signals with encoded data (e.g., images suitable for display and/or storage). In some embodiments, image detection points 320 can occur at a frequency that is four, eight or sixteen times the frequency at which signal segments 310 are provided. For example, image detection points can include one or more points corresponding to each signal segment as well as any number of points corresponding to each gap between the signal segments. In some embodiments, the rate of image detection points (e.g., points 320) may be limited by the frame rate of a camera in a device (see, e.g., camera 107 shown in FIG. 1 and camera 217 shown in FIG. 2) or image processing circuitry in a device (see, e.g., image processing circuitry 108 shown in FIG. 1 and image processing circuitry 218 shown in FIG. 2). For example, the rate of image detection points may not exceed the frame rate of a device's camera or image processing circuitry. In such embodiments, infrared transmitters (e.g., transmitter 290 shown in FIG. 2) may be configured so that the rate at which infrared signal segments are provided (e.g., the rate at which segments 310 are provided) does not exceed half the frame rate of a device's camera or image processing circuitry.

Figure 4:
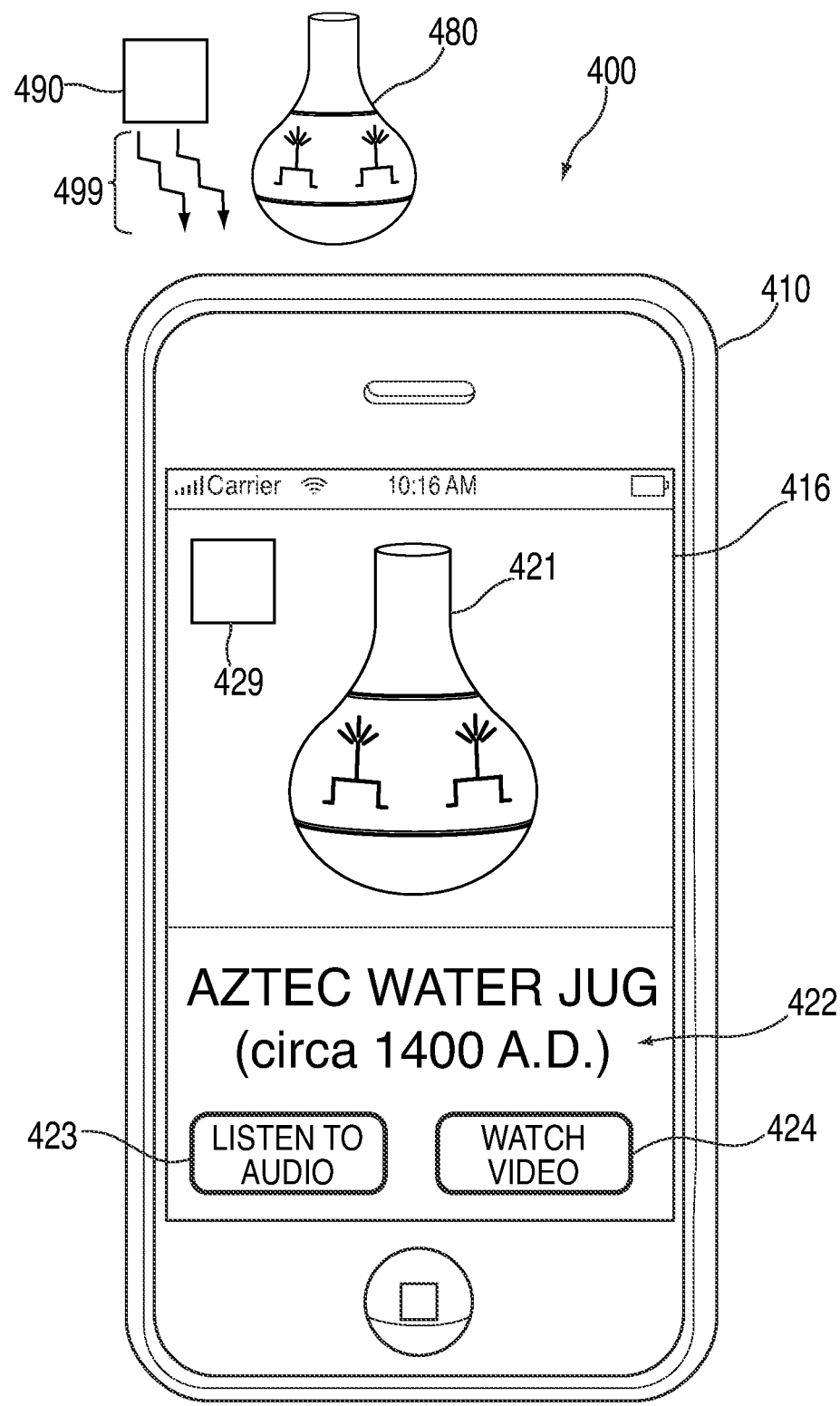
FIG. 4 is a perspective view of an illustrative system for communicating infrared data in accordance with one embodiment of the invention.

In some embodiments, infrared data can be received and an electronic device can present information to a user based on the infrared data. For example, a transmitter can be located adjacent to an object and an electronic device can receive infrared data that includes information about the object. FIG. 4 is a perspective view of an illustrative system for communicating infrared data in accordance with one embodiment of the invention. System 400 can include transmitter 490 and electronic device 410. Transmitter 490 can generate infrared signals 499 with encoded data, and electronic device 410 can receive infrared signals 499, decode the data in infrared signals 499 and display information based on the decoded data.

Transmitter 490 may be substantially similar to transmitter 290 shown in FIG. 2 and the previous description of the latter can be applied to the former. For example, transmitter 490 can include an infrared emitter for generating infrared signals based on control signals (see, e.g., infrared emitter 297 shown in FIG. 2) and control circuitry for controlling the infrared emitter (see, e.g., control circuitry 291 shown in FIG. 2). In some embodiments, transmitter 490 may emit a directed beam of infrared light (e.g., by manipulating the infrared light with one or more lenses) so that only cameras in the beam can detect the infrared light. For example, transmitter 490 can function as a "spot light" generating an infrared signal that can only be received by cameras located generally in front of transmitter 490. This directed beam approach may be advantageous in situations where multiple transmitters are located in the same room because it may prevent a camera from receiving infrared signals from multiple transmitters. For example, if a museum includes multiple exhibits in a room with a transmitter for each exhibit, it may be advantageous to employ transmitters that generate directed beams of infrared light so that the cameras do not receive infrared signals from multiple transmitters. On the other hand, if a museum includes a single exhibit in a room, it may be advantageous to employ one or more transmitters that generate strobes of infrared light so that all cameras in the room can receive the infrared signals. As previously discussed, a transmitter can encode data in an infrared signal using any suitable technique. For example, transmitter 490 can encode data in infrared signal 499 using amplitude modulation, frequency modulation, phase modulation or any combination thereof.

Transmitter 490 can be located adjacent to object 480. For example, object 480 can be an exhibit at a museum and transmitter 490 can be located adjacent to the object. In some embodiments, transmitter 490 can include visible indicia that also convey information about object 480. For example, transmitter 490 can be in the form of a plaque with writing that conveys information about object 480.

Device 410 can be an electronic device with a camera. Device 410 can be substantially similar to device 100 shown in FIG. 1 and device 210 shown in FIG. 2 and the previous descriptions of the latter can be applied to the former. For example, device 410 can include a camera (not shown) for capturing images based on visible light as well as images that include an infrared signal with encoded data (see, e.g., camera 107 shown in FIG. 1 and camera 217 shown in FIG. 2). Device 410 can include display 416 (see, e.g., display 106 shown in FIG. 1) and any other suitable electronic device components (see, e.g., control circuitry 101, storage 102, memory 103, communications circuitry 104, input interface 105, and image processing circuitry 108).

Display 416 can display information 422 based on infrared data received by device 410. For example, transmitter 490 may generate infrared signals 499 with encoded data that represents information about object 480. Continuing the example, electronic device 410 can receive infrared signals 499 using a camera (see, e.g., camera 107 shown in FIG. 1 and camera 217 shown in FIG. 2) and decode the data in the infrared signals. Display 416 can then display information 422 to a user based on the decoded data.

In some embodiments, display 416 can provide one or more images detected by device 410 in combination with information received by device 410. For example, information 422 can be overlaid on a picture captured by device 410 or a live video stream captured by device 410. As seen in FIG. 4, display 416 can provide at least one image detected by device 410 that includes representation 421 of object 480. Information 422 can be provided adjacent to representation 421 so that a user can associate the information with object 480. The image provided by display 416 can also include representation 429 of transmitter 490. As previously discussed, an electronic device can control the timing (e.g., rate) of image detection based on an infrared signal. For example, infrared signal 499 may include multiple segments with gaps between the segments (see, e.g., signal segments 310 shown in FIG. 3), and device 410 may capture one or more images that include representations 421 and 429 during gaps between infrared signal segments (see, e.g., detection points 322 and 324 shown in FIG. 3). Accordingly, display 416 can display an image that does not include any affects from infrared signal 499. For example, the area around representation 429 of transmitter 490 may be free from any washed out or blacked out affects of infrared light. In embodiments where display 416 is providing a video feed captured by device 410, display 416 may alternate between updating the detected image and decoding infrared signals so that the detected image appears live even though every second image may include an infrared signal with encoded data and be blocked from display 416 (e.g., routed to control circuitry for decoding the infrared signal).

In some embodiments, information based on infrared data may be provided in different locations of a display based on where the transmitter is located relative to the device. For example, if a transmitter is located above and to the left of a device, information based on infrared data received from the transmitter may be provided in a top-left corner of the device's display. In some embodiments, information may be provided at a location of the device's display that overlaps a representation of the transmitter. Providing information in this localized manner may be advantageous in situations where there are multiple objects in a detected image because localized display of information can direct a user's attention to the corresponding object. For example, if there are multiple pieces of art on a single wall and a transmitter adjacent to one of the pieces that generates infrared signals with encoded data about that piece, information based on the infrared signals can be provided adjacent to or overlapping the representation of the transmitter (e.g., representation 429 of transmitter 490) so that a user can easily associate the information with the corresponding piece of art.

In some embodiments, display 416 can provide options for a user to obtain additional information or content about object 480. For example, display 416 can include audio option 423 that a user can select to request a prerecorded audio segment and video option 424 that a user can select to request a prerecorded video segment. In some embodiments, a device may stream or download additional information or content about an object in response to a user requesting additional information. For example, a device may receive additional information or content through infrared signals 499 in response to a user requesting additional information. In another example, a device may download additional information or content through another communication protocol in response to a user requesting additional information. In such an example, the device may obtain a reference number from infrared signal 499 and then use that reference number to request additional information or content through a wireless communication protocol (e.g., an 802.11 protocol). However obtained, a device can then provide additional information or content to a user. For example, a device can play back a prerecorded audio segment about object 480 in response to a user selecting option 423 or play back a prerecorded video segment about object 480 in response to a user selecting option 424. In some embodiments, a device may simply provide additional information that is already stored on the device (e.g., in storage or memory) in response to a user requesting additional information. For example, a device may obtain a reference number from infrared signal 499 and then use that reference number to retrieve additional information or content stored on the device.

While the previous discussion makes references to an infrared communications system for communicating information about exhibits in a museum, it is understood that infrared communications systems in accordance with the disclosure can be used to communicate information about any type of object. For example, infrared communications systems can be used to communicate information about objects for sale in a retail environment (e.g., manufacturer, designer, price and discount status).

Figure 5:
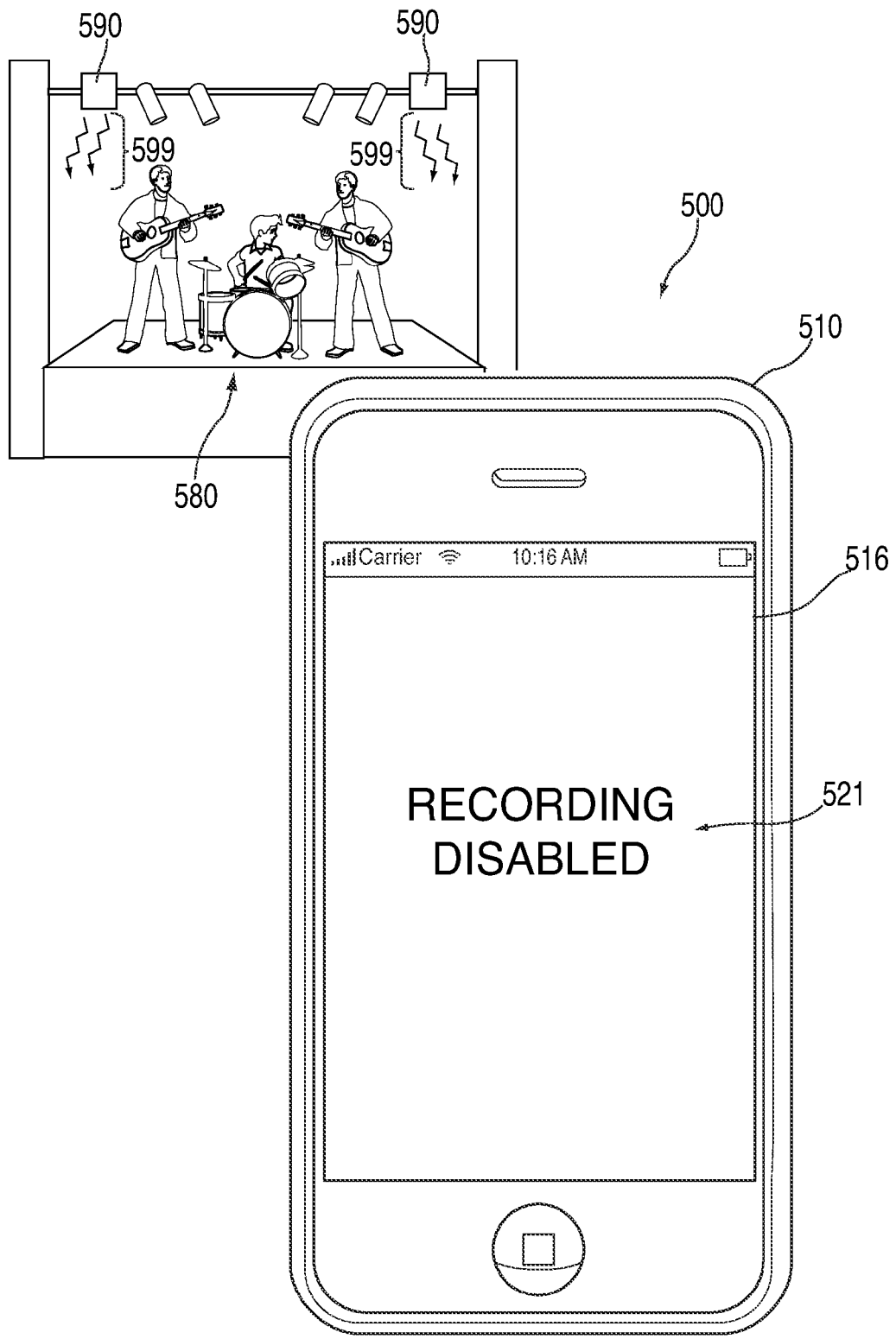
FIG. 5 is a perspective view of an illustrative system for communicating infrared data in accordance with one embodiment of the invention.

In some embodiments, infrared data can be received and an electronic device can modify a device operation based on the infrared data. For example, an electronic device can disable a function of the device based on received infrared data. In some embodiments, a transmitter can be located in areas where capturing pictures and videos is prohibited (e.g., a concert or a classified facility) and the transmitters can generate infrared signals with encoded data that includes commands temporarily disabling recording functions. Accordingly, devices near the transmitter may be able to detect images to receive the infrared signals and the commands encoded in the signal but those devices may be unable to capture pictures or videos because of the commands. FIG. 5 is a perspective view of an illustrative system for communicating infrared data in accordance with one embodiment of the invention. System 500 can include transmitters 590 and electronic device 510. Transmitters 590 can generate infrared signals 599 with encoded data, and electronic device 510 can receive infrared signals 599, decode the data in infrared signals 599 and modify a device operation based on the decoded data. For example, device 510 can disable a function of the device based on the decoded data.

Transmitters 590 may each be substantially similar to transmitter 290 shown in FIG. 2 and the previous description of the latter can be applied to the former. For example, each of transmitters 590 can include an infrared emitter for generating infrared signals based on control signals (see, e.g., infrared emitter 297 shown in FIG. 2) and control circuitry for controlling the infrared emitter (see, e.g., control circuitry 291 shown in FIG. 2). In some embodiments, transmitters 590 may emit a strobe of infrared light that cameras in the same general area of transmitters 590 can detect, regardless of the direction the cameras are facing. For example, transmitters 590 can function as a beacon generating infrared signals 599 that are easy for cameras to detect. As previously discussed, transmitters can encode data in an infrared signal using any suitable technique. For example, transmitters 590 can encode data in infrared signal 599 using amplitude modulation, frequency modulation, phase modulation or any combination thereof.

In some embodiments, transmitters 590 may be synchronized so that transmitters 590 can generate infrared signals 599 in a synchronized manner. For example, transmitters 590 may be electrically or wirelessly coupled together to synchronize infrared signals 599. In another example, transmitters 590 can be under the direction of a single instance of control circuitry (see, e.g., control circuitry 291 shown in FIG. 2) that is shared between the devices.

In the embodiment shown in FIG. 5, transmitters 590 can be located adjacent to stage 580. Accordingly, when a device near stage 580 or pointed at stage 580 receives an infrared signal from transmitters 590, the device's may be unable to capture pictures of videos because of a command encoded in the infrared signal.

Device 510 can be an electronic device with a camera. Device 510 can be substantially similar to device 100 shown in FIG. 1 and device 210 shown in FIG. 2 and the previous descriptions of the latter can be applied to the former. For example, device 510 can include a camera (not shown) for capturing images based on visible light as well as images that include an infrared signal with encoded data (see, e.g., camera 107 shown in FIG. 1 and camera 217 shown in FIG. 2). Device 510 can include display 516 (see, e.g., display 106 shown in FIG. 1) and any other suitable electronic device components (see, e.g., control circuitry 101, storage 102, memory 103, communications circuitry 104, input interface 105, and image processing circuitry 108).

As previously discussed, the ability of device 510 to capture pictures or videos may be disabled based on a command encoded in an infrared signal. Accordingly, device 510 may be unable to display or store images if the device has received a command to disable recording. In some embodiments, display 516 may provide indicator 521 to a user to convey that it has received a command to disable recording. For example, if a user selects a record function while that function is temporarily disabled, display 516 may provide a black screen with indicator 521 to notify the user that recording has been disabled.

In some embodiments, a device may apply a watermark to detected images as an alternative to completely disabling a recording function. For example, a device may receive infrared signals with encoded data that includes a command to apply a watermark to detected images. In such an example, the device may then apply the watermark to all detected images that are displayed or stored (e.g., single pictures or frames of a video).

Figure 6:
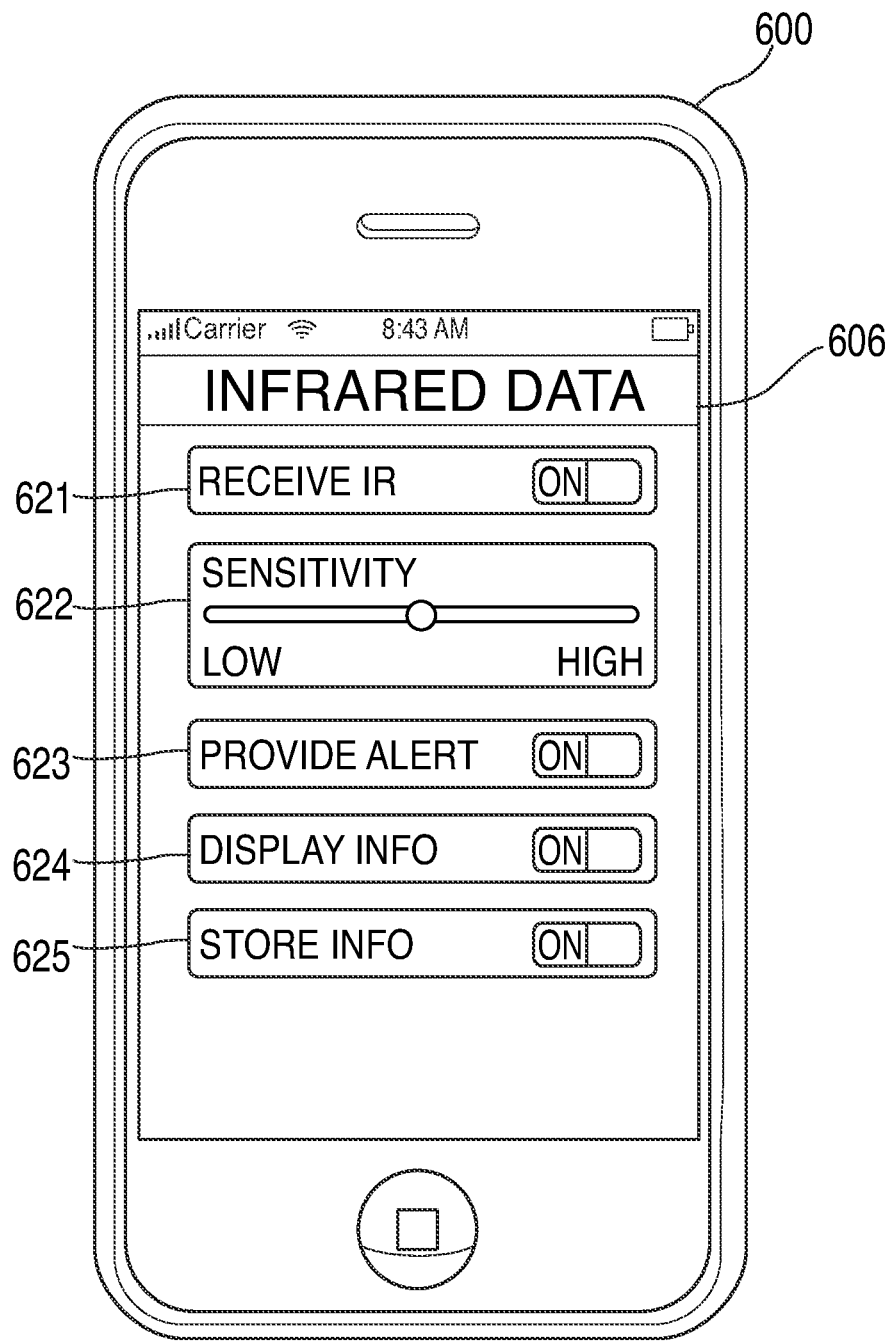
FIG. 6 is a perspective view of an illustrative screen for configuring an electronic device to receive infrared data in accordance with one embodiment of the invention.

In some embodiments, a user can configure a system to receive infrared data. A user may be able to configure several aspects of receiving infrared data or performing functions based on received infrared data. For example, a user may be able to specify the sensitivity of image processing circuitry when receiving infrared data. In another example, a user may be able to specify what information is displayed in response to receiving infrared data. FIG. 6 is a perspective view of an illustrative screen for configuring an electronic device to receive infrared data in accordance with one embodiment of the invention. Device 600 can be an electronic device with a camera. Device 600 can be substantially similar to device 100 shown in FIG. 1 and device 210 shown in FIG. 2 and the previous descriptions of the latter can be applied to the former. For example, device 600 can include a camera (not shown) for capturing images based on visible light as well as images that include an infrared signal with encoded data (see, e.g., camera 107 shown in FIG. 1 and camera 217 shown in FIG. 2). Device 600 can include display 606 (see, e.g., display 106 shown in FIG. 1) and any other suitable electronic device components (see, e.g., control circuitry 101, storage 102, memory 103, communications circuitry 104, input interface 105, and image processing circuitry 108).

Electronic device 600 can display a configuration screen on display 606 as part of the device's configuration options. A configuration screen can include options for controlling how infrared data is received. In some embodiments, display 606 may provide option 621 corresponding to receiving infrared data generally. For example, a user may set option 621 to "OFF" so that device 600 cannot receive any infrared data. In the embodiment shown in FIG. 6, option 621 may be set to "ON" so that the device can receive infrared data (e.g., the device can detect images that include infrared signals with encoded data). In some embodiments, display 606 may provide option 622 corresponding to infrared sensitivity. For example, a user may set option 622 on a sliding scale between "LOW" and "HIGH" to specify the sensitivity of device 600 to infrared signals. More specifically, the value of option 622 may specify the sensitivity of image processing circuitry in device 600 (see, e.g., image processing circuitry 108 shown in FIG. 1 and image processing circuitry 218 shown in FIG. 2). If option 622 is set to a "LOW" sensitivity, device 600 may only determine that a detected image includes an infrared signal with encoded data if the image includes a relatively large number of pixels representing infrared light. On the other hand, if option 622 is set to a "HIGH" sensitivity, device 600 may determine that a detected image includes an infrared signal with encoded data if the image includes only a modest number of pixels representing infrared light. As previously discussed, an image processing circuitry in a device can use any suitable technique or combination of techniques for determining if a detected image includes an infrared signal with encoded data. Accordingly, sensitivity option 622 can specify one or more suitable aspects of the technique or combination of techniques used to determine if a detect image includes an infrared signal with encoded data.

A configuration screen can include options corresponding to one or more functions performed based on received infrared data. In some embodiments, display 606 may provide option 623 corresponding to alerts when receiving infrared data. For example, a user may set option 623 to "OFF" so that device 600 will not provide any alerts when receiving infrared data. In the embodiment shown in FIG. 6, option 623 may be set to "ON" so that device 600 provides an alert when receiving infrared data. For example, device 600 may provide an audio alert (e.g., a chime), a visual alert (e.g., an icon), a tactile alert (e.g., a vibration), or any combination thereof in response to receiving infrared data.

In some embodiments, display 606 may provide option 624 corresponding to the display of information received via infrared data. For example, a user may set option 624 to "OFF" so that device 600 will not display information received through infrared data. In the embodiment shown in FIG. 6, option 624 may be set to "ON" so that device 600 displays information received through infrared data. For example, if device 600 detects an infrared signal with encoded data, display 606 may display information in the data (see, e.g., device 410 displaying information 422, both of which are shown in FIG. 4).

In some embodiments, display 606 may provide option 625 corresponding to the storage of information received via infrared data. For example, a user may set option 625 to "OFF" so that device 600 will not storage information received through infrared data. In the embodiment shown in FIG. 6, option 625 may be set to "ON" so that device 600 stores information received through infrared data. For example, if device 600 detects an infrared signal with encoded data, device 600 may store the data for later access.

It is understood that, in embodiments where an infrared data includes commands to temporarily disable a device function, a user may not be able to set configuration options that override the disable commands. Allowing a user to set options in such a manner may defeat the purpose of providing disable commands through infrared data by allowing a user to perform the function meant to be disabled.

Figure 7:
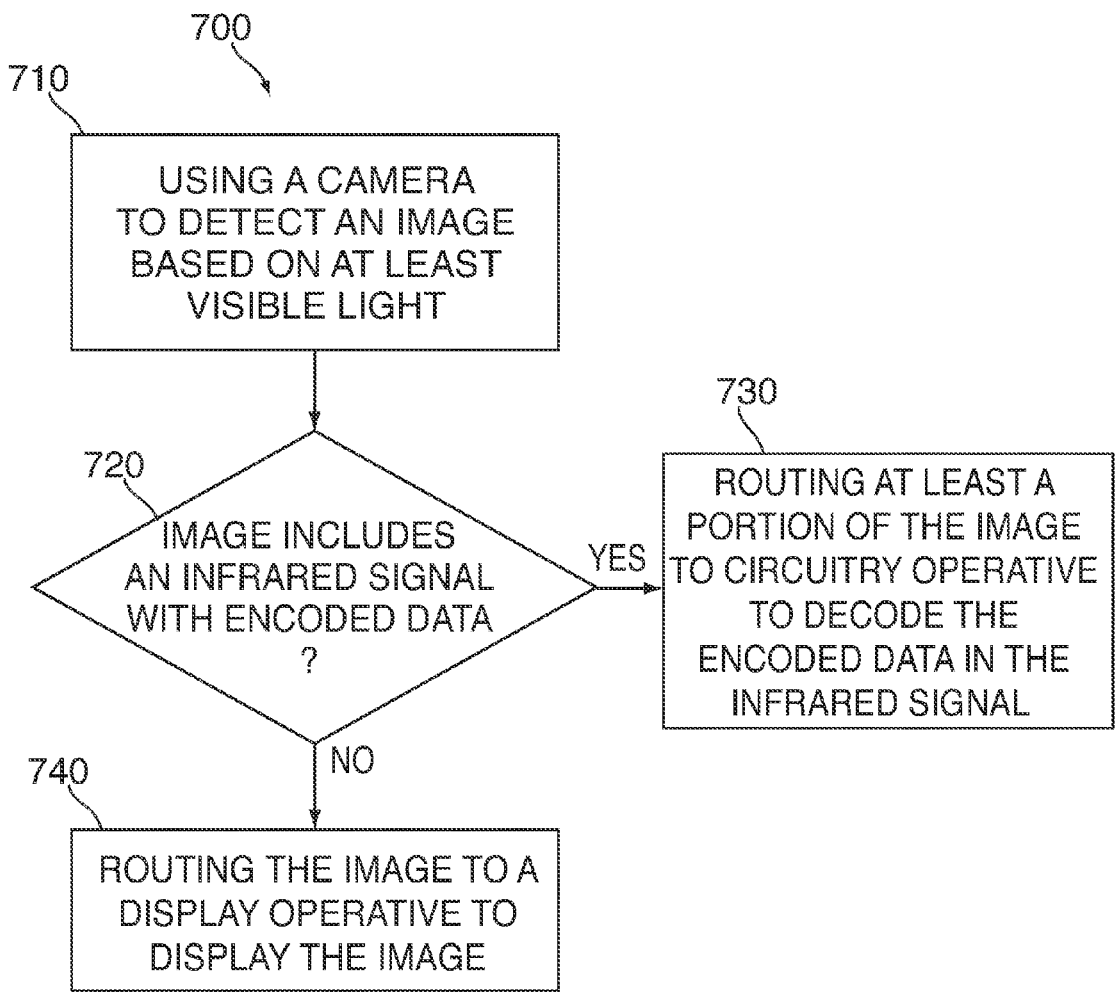
FIG. 7 is a flowchart of an illustrative process for receiving infrared data in accordance with one embodiment of the invention.

As previously described, a device can include a camera for detecting images and image processing circuitry that selectively routes each detected image based on whether the image includes an infrared signal with encoded data. Detected images that include an infrared signal with encoded data can then be routed to circuitry for decoding the data. FIG. 7 is a flowchart of illustrative process 700 for receiving infrared data in accordance with one embodiment of the invention. Process 700 can be performed by an electronic device with a camera (e.g., device 100 shown in FIG. 1 or device 210 shown in FIG. 2). Process 700 can begin with block 710.

At block 710, a camera can be used to detect an image based on at least visible light. For example, a camera in an electronic device can detect an image that includes at least a visible light component. Some images detected by a camera at block 710 may include an infrared light component. For example, some images detect by a camera at block 710 may include infrared signal with encoded data. Any suitable camera can be used to detect an image at block 710 (see, e.g., camera 107 shown in FIG. 1 and camera 217 shown in FIG. 2).

At block 720, whether the image includes an infrared signal with encoded data can be determined. As previously described, any suitable technique can be used to determine whether the image includes an infrared signal with encoded data. For example, a device can determine whether more than a certain number of pixels represent infrared light to determine whether the image includes an infrared signal with encoded data. Moreover, any suitable type of image processing circuitry can be used to determine whether the image includes an infrared signal (see, e.g., image processing circuitry 108 shown in FIG. 1 and image processing circuitry 218 shown in FIG. 2). Block 720 can serve as a decision node in process 700. For example, if an image includes an infrared signal with encoded data, process 700 can proceed with block 730.

At block 730, at least a portion of the image can be routed to circuitry operative to decode the encoded data in the infrared signal. In some embodiments, only the infrared signal in the image can be routed to circuitry operative to decode the encoded data. In other embodiments, the entire image can be routed to circuitry operative to decode the encoded data. Any suitable type of image processing circuitry can route at least a portion of the image at block 730 (see, e.g., image processing circuitry 108 shown in FIG. 1 and image processing circuitry 218 shown in FIG. 2). Moreover, at least a portion of the image can be routed to any suitable circuitry operative to decode the encoded data. In some embodiments, at least a portion of the image can be routed to control circuitry operative to decode the encoded data (see, e.g., control circuitry 101 shown in FIG. 1 and control circuitry 211 shown in FIG. 2).

In some embodiments, process 700 can also include decoding the encoded data and modifying a device operation based at least on the decoded data. For example, process 700 can include applying a watermark to a detected image. In another example, process 700 can include disabling a device function (e.g., a record function) based on the captured image.

Returning to block 720, if an image does not include an infrared signal with encoded data, process 700 can proceed with block 740. At block 740, the image can be routed to a display operative to display the image. Any suitable type of image processing circuitry can route the image at block 740 (see, e.g., image processing circuitry 108 shown in FIG. 1 and image processing circuitry 218 shown in FIG. 2).

Figure 8:
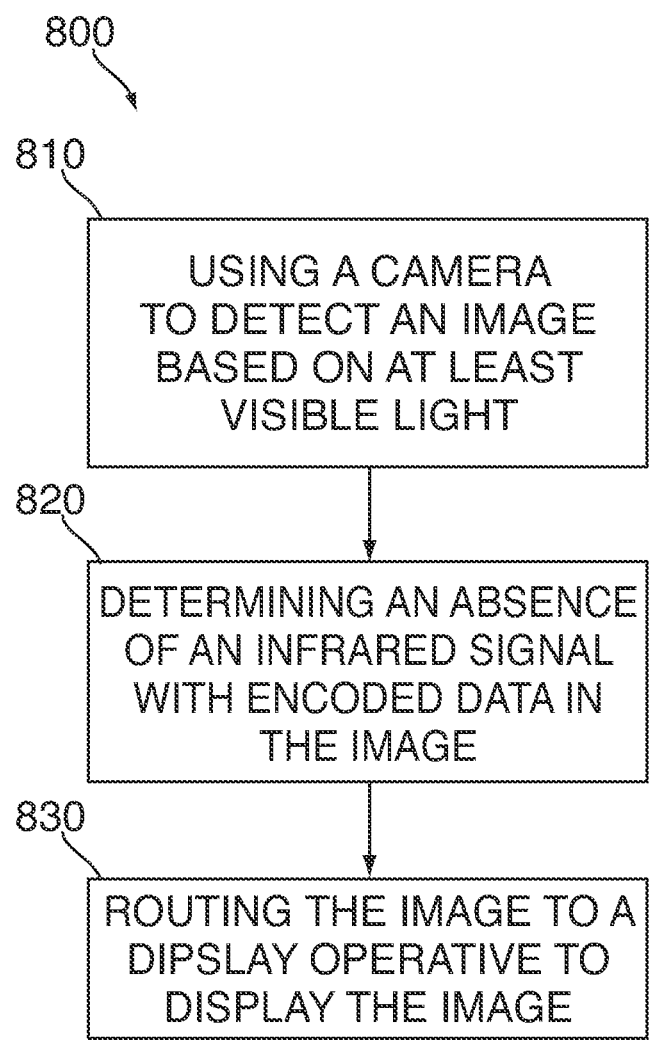
FIG. 8 is a flowchart of an illustrative process for operating a camera and image processing circuitry in accordance with one embodiment of the invention.

As previously described, an electronic device can route only detected images that do not include an infrared signal with encoded data to a display. For example, a system can operate a camera and image processing circuitry to prevent images including infrared signals with encoded data from being displayed or stored. FIG. 8 is a flowchart of illustrative process 800 for operating a camera and image processing circuitry in accordance with one embodiment of the invention. Process 800 can be performed by an electronic device with a camera (e.g., device 100 shown in FIG. 1 or device 210 shown in FIG. 2). Process 800 can begin with block 810.

At block 810, a camera can be used to detect an image based on at least visible light. Block 810 may be substantially similar to block 710 of process 700 and the previous description of the latter can be applied to former.

At block 820, image processing circuitry can determine an absence of an infrared signal with encoded data in the image. For example, any suitable image processing circuitry (see, e.g., image processing circuitry 108 shown in FIG. 1 and image processing circuitry 218 shown in FIG. 2) can determine if an image lacks infrared signals with encoded data. Identifying the absence of infrared signals with encoded data may be advantageous because such infrared signal may affect the suitability of the image as a picture or video frame.

At block 830, the image ca be routed to a display operative to display the image. Block 830 may be substantially similar to block 740 of process 700 and the previous description of the latter can be applied to the former. In some embodiments, process 800 can also include displaying the image on the display. In some embodiments, process 800 can also include displaying the image on the display as a frame of a captured video.

Figure 9:
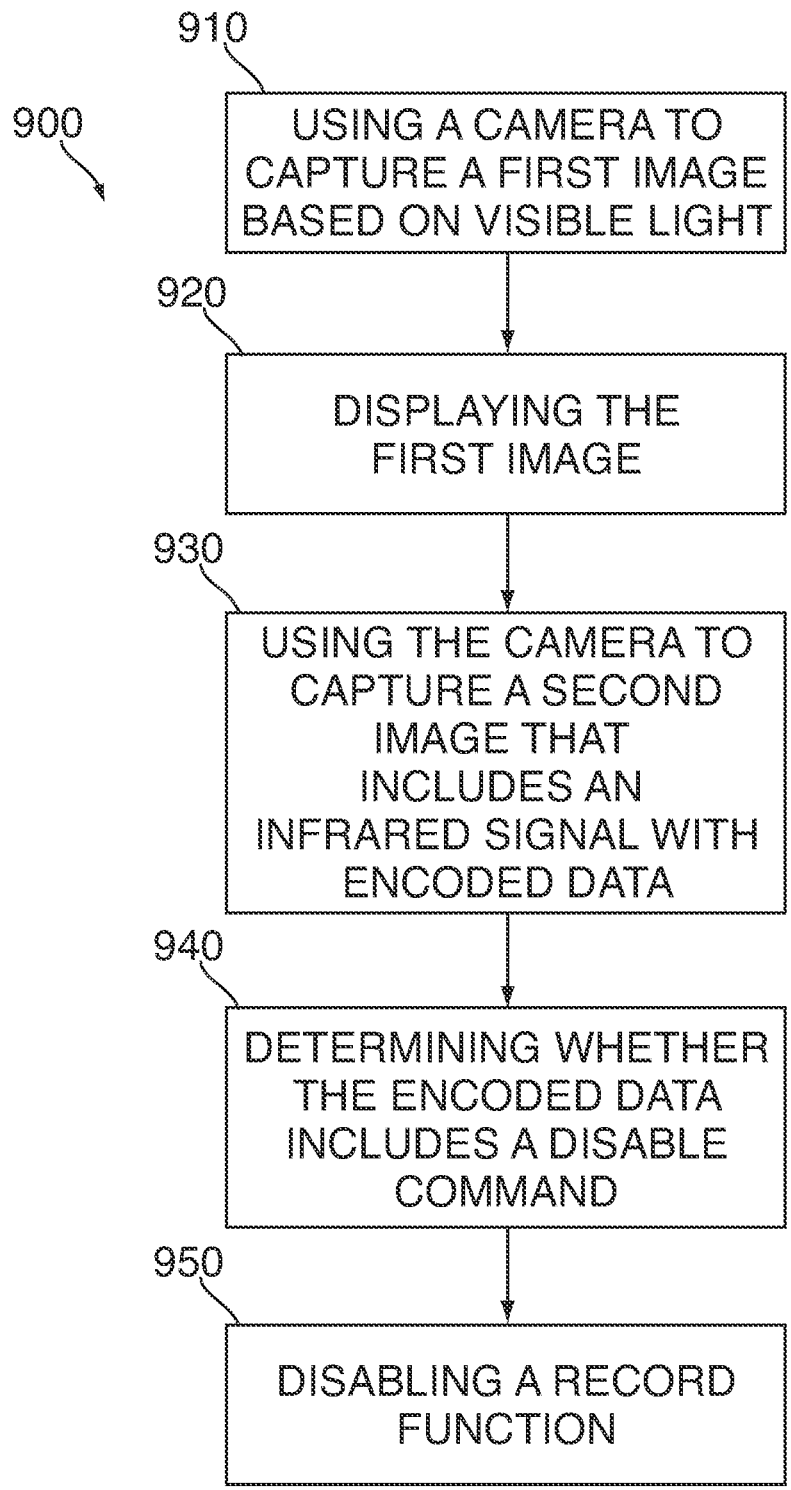
FIG. 9 is a flowchart of an illustrative process for receiving infrared data in accordance with one embodiment of the invention.

As previously described, an electronic device can receive infrared signal with encoded data and then disable a device function based on the decoded data. FIG. 9 is a flowchart of illustrative process 900 for receiving infrared data in accordance with one embodiment of the invention. Process 900 can be performed by an electronic device with a camera (e.g., device 100 shown in FIG. 1 or device 210 shown in FIG. 2). Process 900 can begin with block 910.

At block 910, a camera can be used to capture a first image based on visible light. For example, a camera in an electronic device can detect an image that includes visible light. In some embodiments, a first image detected at block 910 may only include visible light. For example, a first image detected at block 910 may be completely free of infrared signals with encoded data. In some embodiments, block 910 may occur at a detection point when no infrared signal is being generated (see, e.g., detection points 322 and 324, both of which are shown in FIG. 3). Any suitable camera can be used to detect an image at block 910 (see, e.g., camera 107 shown in FIG. 1 and camera 217 shown in FIG. 2).

At block 920, the first image can be displayed. For example, a device can display the first image as a single picture or a frame in a video. Any suitable display can be used to display an image at block 920 (see, e.g., display 106 shown in FIG. 1 and display 216 shown in FIG. 2).

At block 930, the camera can be used to capture a second image that includes an infrared signal with encoded data. For example, the camera can be used to capture a second image that includes one or more pixels representing infrared light that is modulated in a way to communicate data. In some embodiments, block 930 may occur at a detection point when an infrared signal is being generated (see, e.g., detection points 321, 323 and 325, each of which is shown in FIG. 3). Like block 910, any suitable camera can be used to detect an image at block 930 (see, e.g., camera 107 shown in FIG. 1 and camera 217 shown in FIG. 2).

At block 940, whether the encoded data includes a disable command can be determined. For example, the encoded data can be decoded to determine whether the data includes a disable command. Determining whether the encoded data includes a disable command can be determined by any suitable circuitry (see, e.g., control circuitry 101 shown in FIG. 1 and control circuitry 211 shown in FIG. 2). In response to determining that the encoded data includes a disable command, process 900 can proceed to block 950.

At block 950, a record function can be disabled. For example, if the encoded data includes a disable command, the device can temporarily disable its record function for a period of time after receiving the command (e.g., 30 seconds or 30 minutes). After the device's record function is disabled, the device may not be able to store images detected by the device. In some embodiments, after the device's record function is disabled, the device may not be able to even display images detected by the device (see, e.g., system 500 shown in FIG. 5). In some embodiments, a device may even delete one or more of the most recently stored images (e.g., the first image detected at block 910) when disabling the device's record function.

The various embodiments of the invention may be implemented by software, but can also be implemented in hardware or a combination of hardware and software. The invention can also be embodied as computer readable code on a computer readable medium. The computer readable medium can be any data storage device that can store data which can thereafter be read by a computer system. Examples of a computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The above described embodiments of the invention are presented for purposes of illustration and not of limitation.

What is claimed is:

1. A method comprising:
capturing a first image by an image sensor;
extracting from the first image a first content indicative of a first nonvisible component;
capturing, after the first image second image by the image sensor;
extracting from the second image a second content indicative of a second nonvisible component;
capturing of a third image, based on the first and second content, wherein the third image contains only visible components; and
storing of the third image in memory.

2. The method of claim 1,
wherein the first nonvisible component and the second nonvisible component comprise infrared data.

3. The method of claim 2, wherein the first content and the second content comprise timing information of a subsequent visible component.

4. The method of claim 2, wherein the infrared data comprises a disable command to render a function of an electronic device temporarily inoperable.

5. The method of claim 4, wherein the function comprises a record function.

6. The method of claim 5, wherein the capturing of the first, second, and third image is done by the electronic device.

7. The method of claim 1, wherein the storing of the third image in memory comprises displaying on a screen, information based on the first and the second content.

8. A method comprising:
capturing a first image by an image sensor;
extracting from the first image a first content indicative of a first nonvisible component;
capturing, after the first image, a second image by the image sensor;
extracting from the second image a second content indicative of a second nonvisible component;
decoding the first content and the second content;
capturing of a third image, based on the decoding, wherein the third image contains only visible components; and
displaying, on a display screen, the third image and at the same time additional information based on the decoded first and second content.

9. The method of claim 8, wherein the additional information includes information about an object in the third image.

10. A system comprising:
a camera configured to capture a first image comprising a first content indicative of a first nonvisible component;
the camera further configured to capture a second image, after the first image, comprising a second content indicative of a second nonvisible component;
an image processing circuit configured to analyze the first and second content;
the camera further configured to capture a third image based on the analysis; and
a memory configured to store the third image.

11. A non-transitory program storage device, readable by one or more processors and comprising instructions stored thereon to cause the one or more processors to:
capture a first image by an image sensor;
extract from the first image a first content indicative of a first nonvisible component;
capture, after the first image, a second image by the image sensor;
extract from the second image a second content indicative of a second nonvisible component;
capture a third image, based on the first and second content, wherein the third image contains only visible components; and
store of the third image in memory.

12. The program storage device of claim 11 wherein the first content and the second content comprise infrared data.

13. The program storage device of claim 12 wherein the first content and the second content comprise timing information of a subsequent visible component.

14. The program storage device of claim 12 wherein the infrared data comprises a disable command to render a function of an electronic device temporarily inoperable.

* * * * *